United States Patent [19]  
Pierce et al.

[11] Patent Number: 4,598,393  
[45] Date of Patent: Jul. 1, 1986

[54] THREE-BEAM OPTICAL SERVO TRACKING SYSTEM WITH TWO-TRACK PARALLEL READOUT

[75] Inventors: Gerald A. Pierce, Redwood City; James L. Buxton, East Palo Alto; Norman A. Peppers, Belmont; Warren J. Vinzant, Menlo Park, all of Calif.

[73] Assignee: Drexler Technology Corporation, Mountain View, Calif.

[21] Appl. No.: 597,485

[22] Filed: Apr. 6, 1984

[51] Int. Cl.[4] .................... G11B 7/013; G11B 7/125
[52] U.S. Cl. .................................. 369/46; 369/49; 369/109; 369/116; 369/122
[58] Field of Search ............ 369/44, 45, 46, 48, 369/49, 30, 32, 111, 109, 116, 121, 122; 360/77

[56] References Cited

U.S. PATENT DOCUMENTS

| | | | |
|---|---|---|---|
| 4,149,198 | 4/1979 | Behr et al. | 360/77 |
| 4,290,122 | 9/1981 | Bates et al. | 365/234 |
| 4,298,974 | 11/1981 | Tsunoda et al. | 369/45 |
| 4,338,682 | 7/1982 | Hosaka et al. | 369/44 |
| 4,346,471 | 8/1982 | Hirasawa et al. | 369/44 |
| 4,363,116 | 12/1982 | Kleuters et al. | 369/44 |
| 4,428,075 | 1/1984 | Hazel et al. | 369/45 |
| 4,443,870 | 4/1984 | Hazel et al. | 369/44 |
| 4,459,690 | 7/1984 | Corsover et al. | 369/44 |
| 4,462,095 | 7/1984 | Chen | 369/44 |

FOREIGN PATENT DOCUMENTS 58-41446 10/1983 Japan .................................. 369/109

Primary Examiner—Donald McElheny, Jr.

[57] ABSTRACT

A servo tracking system for an optical record uses a pattern of preformed optically detectable uniform servo track marks disposed in parallel spaced apart columns in combination with a beam from a radiation source split by a diffraction grating into three beams having unequal power distribution. The placement of the beams across the pattern of preformed servo tracks on an optical recording material has one position for writing data by the center beam on an information track while the two outside beams intercept track marks on two adjacent tracks. For reading recorded data tracks, the beams shift to a second position in which the center beam intercepts marks on a servo track while the two outside beams read two adjacent data tracks. Because of the unequal power distribution, increasing the energy level of the radiation source causes the intensity of the middle beam during recording to reach a level sufficient to record while the two outside tracking beams remain below that threshold. The track marks in adjacent columns may be in an offset position with regard to track marks of the adjoining column, to provide self-clocking during recording.

14 Claims, 5 Drawing Figures

THREE-BEAM OPTICAL SERVO TRACKING SYSTEM WITH TWO-TRACK PARALLEL READOUT

DESCRIPTION

1. Technical Field

The invention relates to servo tracking systems and in particular to servo tracking systems for writing and reading on an optical recording material.

2. Background Art

In the field of optical recording media, various means have been used to maintain a radiation beam in the correct path or track in order to record or read data in the track. Prior art discloses servo tracking in which a write/read beam is positioned in the data track by the use of one or more tracking beams, either following the data track itself or a parallel servo track. The data track itself may serve as a servo track by means of amplitude measurements such as differences in reflected light from a data track having reflective and non-reflective areas. In one system, a reflective optical video disk reader may employ two beams, one for reading data and another parallel beam at a constant relative position for sensing and correcting beam position on the recorded data track. The position of the reading beam is adjusted in response to the signal level of the reflected light of the tracking beam relative to the signal level of the reading beam. The relative measurement requires a precise focusing of the two reflected beams on two detector cells. In U.S. Pat. No. 4,346,471, a single detector cell is employed to eliminate the necessity of a precise means for focusing two separate beams on two detectors. The detector is alternately switched to detect first the readout beam and then the tracking beam and a shifting device adjusts the position of the optical system in response to differences between the tracking signal and a reference signal.

U.S. Pat. No. 4,338,682 discloses a read beam between two offset tracking beams. The two tracking beams are located so that complementary halves of the focused spot overlap respectively the left and the right edges of the data track, thereby centering the reading beam on the track when the reflected signal levels are equal. The polarities of the signal, indicated by a sinusoidal wave as the two spots move across, on and off the tracks, correspond to the direction the read beam must be moved to center on the track.

In U.S. Pat. No. 4,290,122 multiple read beams are positioned on parallel data tracks by means of a central servo track. The servo track is followed by three beams, a radial tracking beam and a focus control beam focused respectively above and below the focused beam at the center of the multiple read beams on the tracks.

Phase differences in light reflected from a grooved track containing information recorded as non-reflective spots in a reflective coating may be used to provide servo tracking. In U.S. Pat. No. 4,363,116, portions of the track have different depths defining sector address areas and recessed information areas. The recessed information area is located by phase differences in reflected light. Thus the servo information is contained in the phase differences and the user recorded information is contained in the amplitude or reflectivity differences. A single radiation beam is switched between two different intensities, one for writing on an optical record carrier and the second for reading recorded information and checking the radial position. Precision apparatus is needed to record data on master disks of the type of optical records in which the read beam is kept centered by means of one or more slightly offset indexing beams which detect the differences in reflectivities at track edges. Pre-pressing of grooved tracks is required for subsequent recording on the type in which a write or a read beam is kept on the track by detection of phase differences of the reflective beam from the sides of the grooved track.

It is the object of the invention to devise a servo tracking system which does not require pre-pressing of grooved tracks or precision recording of data on blank master disks and subsequent tracking by means of differences in reflectivity in the recorded data track itself. It is another object of the invention to devise a servo tracking system enabling the recording of user information in a cumulative manner on a single optical record. It is another object of the invention to devise a servo tracking system which uses a standardized format of tracking and data recording and simplified writer/reader apparatus at a lower cost for use on such optical records as personal banking or debit data cards. It is another object of the invention to devise a tracking system which does not require multiple radiation sources.

DISCLOSURE OF INVENTION

The above objects have been achieved by a servo tracking system which utilizes an optical recording material having a pattern of preformed, optically detectable uniform track marks disposed in parallel spaced-apart columns on a uniform background. A radiation source is split by a diffraction grating into three aligned beams having an unequal distribution of power in the ratio 1:6:1 at an orientation perpendicular to the track mark columns. The spacing is such that during recording the two outside beams intercept the center of two adjacent columns of track marks and the middle beam is centered on an optically recordable track midway between the two track columns. During recording an increased energy level of the laser source raises the intensity of the middle beam to a level to effect a change in the recording material, thereby recording data, while the increased intensity of the two outside tracking beams will remain below a level to cause recording in the material while detecting the presence of the track marks. When reading data, the middle beam is centered on one column of track marks, thereby lining up the two outside beams on the recorded data in two adjacent information tracks which may be read simultaneously with the energy level of the laser lowered, causing all three beams to be at an intensity level to detect without causing recording.

The track marks in one column may be in an offset position with regard to track marks of adjoining columns so that either the left or right tracking beam is always intercepting part of a track mark for continuous servo tracking control. At the time of preforming track marks in the optical record, additional data such as sector addresses and clocking marks either in the track mark column or in the information track may also be recorded.

The servo tracking system employs an array of photodetectors for detection of the reflected or transmitted beam from the optical recording material.

BEST MODE FOR CARRYING OUT THE INVENTION

Figures 1, 2:
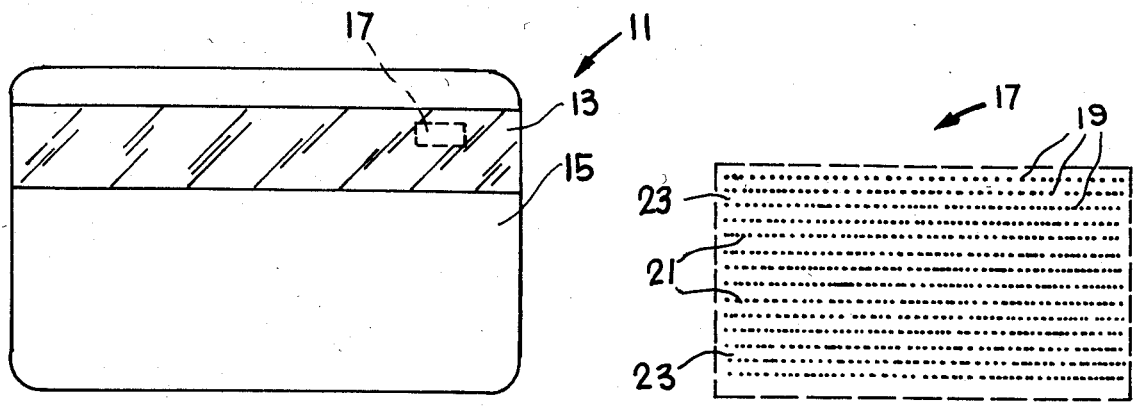
FIG. 1 is a plan view of one side of a data card having an optical recording strip.
FIG. 2 is a detail of a pre-recorded track pattern on a portion of the data card optical recording strip illustrated by dashed lines in FIG. 1.

With reference to FIG. 1 an optical recording material strip 13 is seen inserted on the base 15 of a data card 11. The optical recording strip may be a laser recording material having a uniformly reflective field upon which data is recorded by laser energy-induced changes in the reflectivity of the material. Such changes usually produce pitting of the field, causing increased scattering of light. The pits are indicative of data and are termed "spots" herein. Alternately the optical recording material may have opaque and transparent areas corresponding to data spots.

FIG. 2 is a magnified view of a pre-recorded pattern of optically detectable uniform servo track marks 19 on an optical recording strip 13 corresponding to area 17 of FIG. 1. The track marks are aligned in parallel spaced-apart columns 21 and data spots are recordable in the area 23 between each column. A medium suitable for both high resolution pre-encoding tracking marks and post-encoding data spots is described in U.S Pat. Nos. 4,284,716 and 4,363,870. The data recording medium comprises a colloid matrix having a light absorptive underlayer of black silver and a non-conductive surface layer having reflective silver particles dispersed in the colloid. This medium may be pre-patterned with servo track marks during the formation of the reflective surface layer by using appropriate photomasks. As shown in the enlarged blowup view of FIG. 3, track mark positions in each column 21a may be offset from track mark positions in adjacent column 21b if quadrature clocking is desired. Alternate columns 21a and 21c have track marks aligned in identical locations perpendicular to the column.

The opaque marks forming the servo track may be formed by photomasking techniques prior to the recording of data spots between the columns. Alternatively, for some read-only applications, both servo track and data tracks may be prerecorded simultaneously by photomasking techniques on an optically recordable material such as film.

U.S. Pat. No. 4,304,848 describes a process for replication which is suitable for prerecording opaque track marks in a reflective medium. An unexposed silver-halide emulsion is exposed through an opaque master having the track marks and optionally the data spots to be recorded on the silver-halide emulsion. The exposed areas are developed black, but not fixed. Next, the surface of the remaining unexposed silver-halide emulsion is fogged to create silver precipitating nuclei. The fogged emulsion is exposed to a monobath, containing a weak silver-halide developing agent and a silver-halide solvent, which slightly chemically develops the nuclei and reacts with the undeveloped silver halide to form soluble silver complexes which are transported by diffusion transfer to the silver precipitating nuclei where the silver in the complexes is precipitated and reduced so as to create a reflective silver surface. The track marks and prerecorded data spots will appear as black areas against a reflective recordable background. If both track marks and data spots are prerecorded, an inverse process could also be used such that they appear reflective against a dark background.

Figure 3:
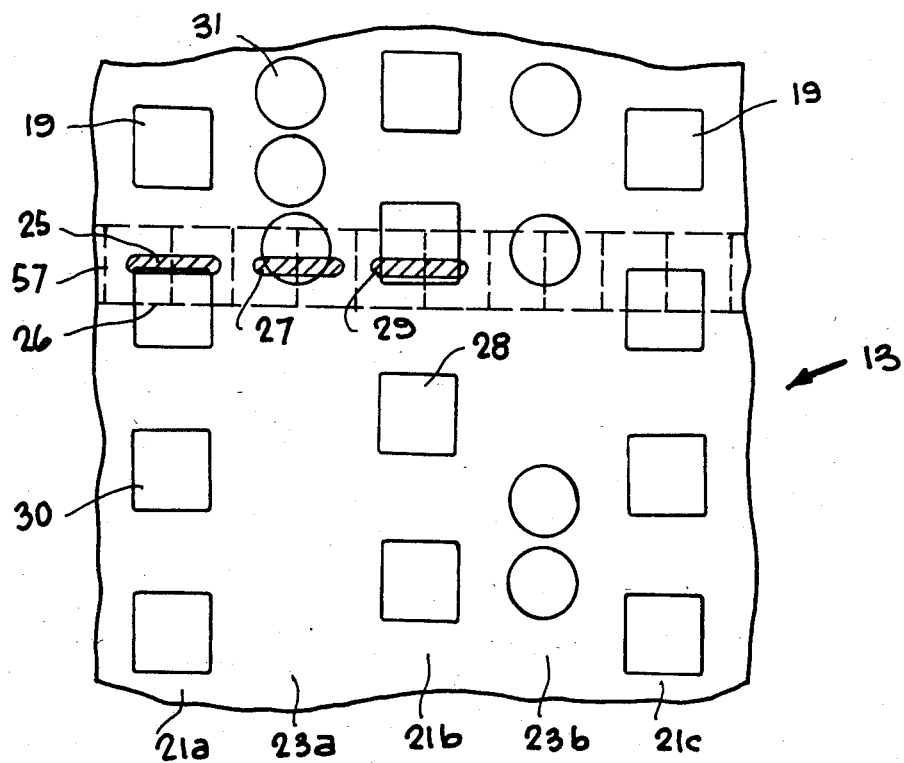
FIG. 3 is a frontal blow-up view of an optical recording strip during recording using the servo tracking system of the present invention.

FIG. 3 shows the position of focused beams 25, 27 and 29, emerging from grating 39, with an unequal distribution of power in the ratio 1:6:1, originating from a single source 43 and disposed in a linear writing/tracking alignment on an optical recording material 13. The three beams are spaced at a distance so that the two outside beams 25 and 29 intercept two parallel servo tracks 21a and 21b, positioning the center beam 27 in the center of the recording track 23a. As the optical recording material is moved under the beams in a direction parallel to the servo tracks, energy changes in reflected or transmitted light are detected as the servo track marks pass under the two outside focused beams 25 and 29.

Figure 4:
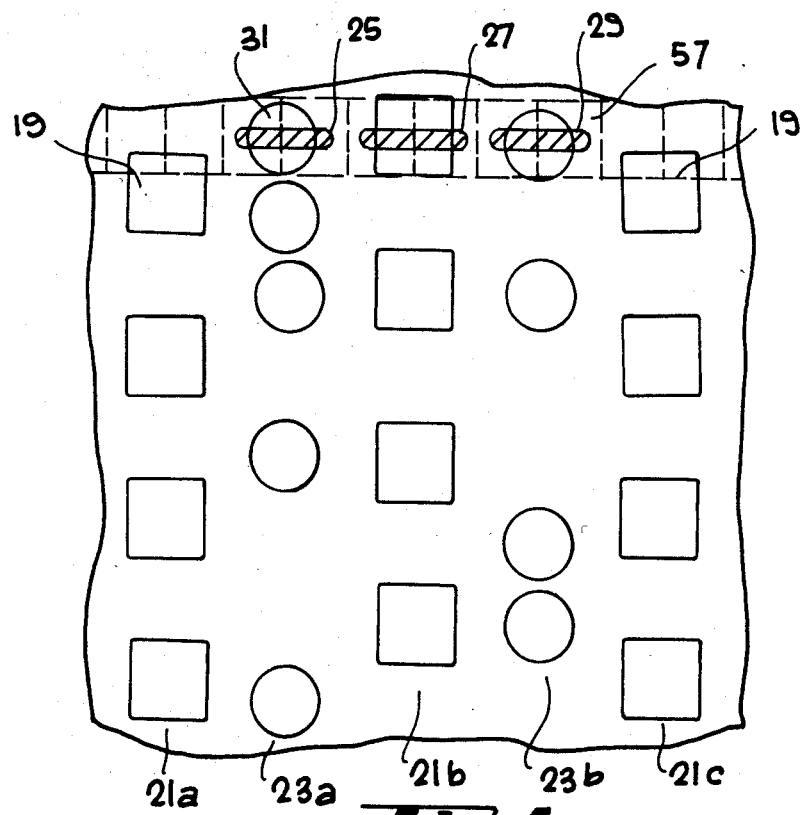
FIG. 4 is a frontal blow-up view of an optical recording strip during readout using the servo tracking system of the present invention.

A linear array of split diode photodetector cells 57 detects reflected or transmitted light from the optical recording material. The preferred embodiment uses a 12 element PIN photodiode array and the reflected or transmitted signal is processed by the detector for data and for tracking servo signal. The detector array is aligned so as to detect reflected or transmitted light from adjacent columns of track marks and data spots as shown in FIGS. 3 and 4. Two side-by-side cells split each mark down the middle. When a beam is centered on a track mark the difference between the two sampling detectors will be zero. If the tracking beam goes off center the difference in the two detector signals provides a directional error signal and is used to drive the tracking servo. When a beam is centered on a data spot the two detector signals of light reflected from the data spots are summed, yielding a larger signal level to the data processing unit. If the track marks in one row are offset from the other as shown in FIG. 3, the signal from one track will be 90 degrees out of phase with a neighboring track, providing self-clocking for speed immunity when writing data. The data track is midway between the servo tracks and is indicated by a series of recorded data spots 31. These spots diminish the intensity of light reflected from the center beam on the data track. When reading data, all beams must have an energy level such that no melting or pitting of the recording medium occurs by impingement of the beam on the medium. When writing data, the energy level of all three beams is increased and the center beam will reach a sufficient energy level to cause pitting or melting of the data area, but the outside beams will have lesser energy, because of the energy distribution ratio of 1:6:1, so that no pitting or deforming of the servo track areas occurs.

Figure 5:
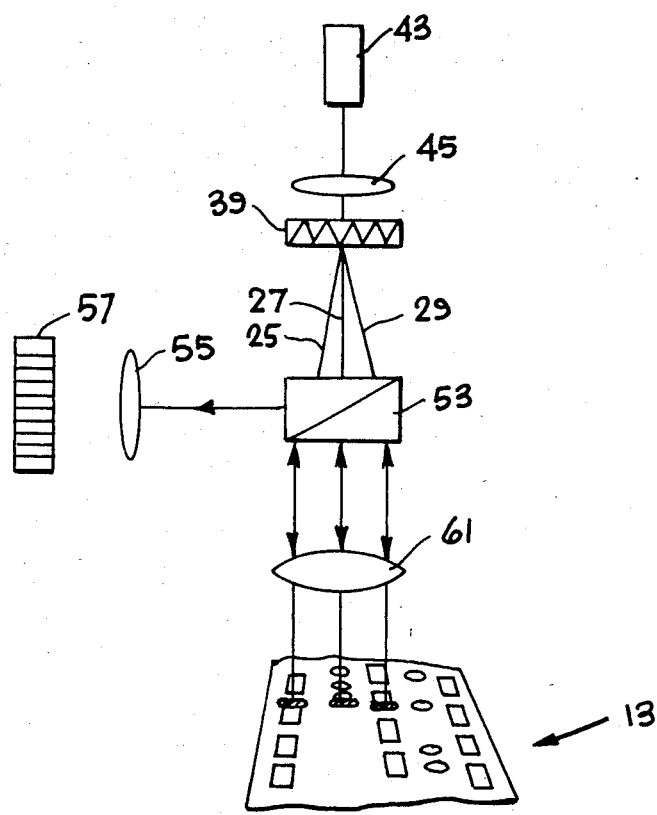
FIG. 5 is a schematic diagram of the optical system employed with reference to the servo tracking system.

The splitting of a radiation source such as a laser, and the spacing of the resultant three beams for tracking, reading, and recording are accomplished by the diffraction grating 39 shown in FIG. 5. As shown in FIG. 4, in the reading mode, the center beam 27 is used as a single tracking beam by means of a column 21b of track marks. The two outside beams 25 and 29 are spaced so as to read the recorded data bits in two data tracks 23a and 23b simultaneously. The energy level of all three beams is at a level below that required to record data since all three are now scanning. Since the data tracks are centered between the servo tracks 21a, 21b and 21c, placement of the tracking beam 27 at the midline of the track mark will automatically line up the two reading beams and the recorded data bits 31. Repositioning of the three beams is accomplished by means of a movable lens 61 which shifts the center beam until the focused spot is over a servo track 21b as detected by a photodetector array, and the two outside scanning beams are then automatically over the data tracks 23a and 23b.

The ability to simultaneously read two data tracks is very valuable. Where different data is recorded in each track the ability to read two data tracks simultaneously results in doubling the data output rate.

FIG. 5 is a schematic diagram showing an optical system which may be employed with the servo tracking system of the invention and a reflective recording material on recording material 13. A source of radiation energy such as a solid state laser 43 emitting in the infrared is collected by lens 45 and passes through diffraction grating 39 where it is split into three spaced-apart beams with an unequal distribution of power. The grating is a holographic phase grating having a center-to-center spacing of 10 μm between the zeroth and the first order beams in the preferred embodiment. The diffraction efficiency leads to an unequal distribution of power in the beams in the ratio $I(-1):I(0):I(+1)=1:6:1$, the zeroth order (center) beam having about six times higher intensity than the two first order (side) beams. The intensity of all the three beams is sufficient to read data. By increasing the power level of the radiation source the middle beam will reach an intensity high enough to record on the optical record but the two side beams do not reach the threshold energy required to write on the media.

A beam splitting prism 53 transmits the three beams through focusing lens 61 to the optical recording surface and also redirects the reflected light from the optical record through focusing lens 55 to a photo detector such as a multi-element PIN photodiode array 57. Light reflected by the optical recording material containing the data spots and the track marks is focused by means of lens 55 to an array of photodetectors 57 for purposes of repositioning the beams in response to the tracking information and reading data bits. The intensity of this measured radiation, either transmitted or reflected, is transmitted to feedback means in order to maintain the beams on the track marks. Typically the detectors provide a servo output signal which is used to maintain crosswise servos for repositioning the focused beam spots. Input to the detectors from the reflected or transmitted light from the data bits is retrieved and decoded in the usual manner. In the preferred embodiment, two photodiodes on the inside of the array are used for tracking in the faster moving read mode and two outside photodiodes are used for tracking in the slower write mode.

We claim:

1. A servo tracking system for an optical record comprising, a pattern of prerecorded marks having optically detectable contrast relative to a field on an optical recording medium, the marks disposed in parallel columns, with each column having spaces between marks, the spacing between columns being sufficient to accommodate data, the marks in each column being aligned in offset positions relative to marks in adjacent columns, a trio of radiation beams impinging on said medium, disposed in a line perpendicular to said columns, the beams having a spacing such that a center beam impinges on one of said columns and two outside beams impinge on the space between the columns where data is written, said radiation beam being split from a single light beam, the center beam having an intensity which is greater than intensities of said outside beams, the intensity level of said beams being insufficient to make optically detectable changes in said recording medium, and, means for detecting each of said beams after impingement with said medium.

2. A servo tracking system for an optical record comprising, a pattern of prerecorded marks having optically detectable contrast relative to a field on an optical recording medium, the marks disposed in parallel columns, with each column having spaces between marks, the spacing between columns being sufficient to accommodate data, a trio of radiation beams impinging on said medium, disposed in a line perpendicular to said columns, the beams having a spacing such that two outside beams impinge on said columns and a center beam between the two outside beams impinges therebetween where data is written, said radiation beams being split from a single light beam, said center beam having an intensity which is greater than intensities of said outside beams, said center beam having an intensity of a level sufficient to record data by making optically detectable changes in said recording medium, said outside beams having intensities of a level insufficient to make optically detectable changes in said recording medium, and means for detecting each of said beams after impingement with said medium.

3. The system of claim 2 wherein the marks in each column are aligned in offset positions relative to marks in adjacent columns, a signal produced from detecting a beam after impingement on one column being ninety degrees out of phase with a signal produced from detecting a beam after impingement on an adjacent column.

4. The system of claim 2 wherein size of each of the outer beams impinging on the medium is of approximately the same size as said marks.

5. A servo tracking system for writing and reading on an optical record comprising, a pattern of preformed, optically detectable uniform servo track marks disposed in parallel spaced-apart columns on an optical recording material, a mark having a size on the order of the size of a tracking beam, a trio of radiation beams disposed in alignment across said columns, at a first position such that two outer beams intercept track marks on each of two adjacent columns and the center beam is positioned equidistant from each column in an information area disposed between said columns, said radiation beams being split from a single light beam into three beams having an unequal distribution of power, means for increasing the intensity of said trio of beams, the center beam in said first position having an intensity at a level sufficient to record data by making optically detectable changes in said information area, said outer beams having an intensity in said first position at a level insufficient to make optically detectable changes in said recording material, means for repositioning said trio of radiation beams at a second position so that the center beam is positioned to impinge upon one column of track marks and the two outside beams are positioned to be centered over two information areas on either side of said track column, said trio of beams having an intensity at said second position so as to cause detection of said servo marks and said recorded data, the intensity of said trio of beams at said second position being insufficient to make optically detectable changes in said recording material, means for providing relative motion between said light beams and said pattern of track marks in a linear direction, parallel to said columns, and detector cells for detecting radiation changes of the beams after impingement with said track marks and said information areas.

6. The servo tracking system of claim 5 further defined by said unequal distribution of power being in the ratio of 1:6:1.

7. The servo tracking system of claim 5 wherein said repositioning means comprises a movable lens which shifts the three beams.

8. The servo tracking system of claim 5 wherein said detector cells are a linear array of photodetector cells.

9. The servo tracking system of claim 8 wherein said linear array of photodetector cells is divided into pairs of cells for each track mark column and each information area.

10. The photodetector cells of claim 9 further defined by said pair of cells on the track mark column providing information for servo tracking by the differences between the two detector cells signals.

11. The photodetector cells of claim 9 further defined by said pair of cells on the information area providing an increased signal by summation.

12. The servo tracking system of claim 5 wherein said optically detectable track marks are non-reflective and said radiation sensitive information area has reflectivity exceeding 10%.

13. The servo tracking system of claim 5 wherein said servo track marks in each column are offset from the position of track marks in the adjacent parallel column such that a signal produced by said detector cells from detecting a beam after impingement on one column is ninety degrees out of phase with a signal produced by said detector cells from detecting a beam after impingement on the adjacent column.

14. A servo tracking system for an optical record comprising, a high resolution reflective direct-read-after-write laser recording material, a pattern of preformed optically contrasting track marks disposed in parallel spaced-apart columns on said recording material, a radiation source for producing a beam of radiation, a diffraction grating for splitting said beam into a trio of parallel beams, having an unequal power distribution in the ratio of 1:6:1, for left outside beam, center beam, and right outside beam, means for focusing said beams on said recording material, means for positioning said trio of beams such that the two outside beams impinge on track marks on two adjacent columns and the center beam is positioned equidistant from each column in a reflective recording area disposed between said columns and means for increasing the intensity of the beams such that the center beam reaches an intensity level sufficient to record data by making optically detectable changes in said reflective recording area, means for positioning said trio of beams such that the center beam impinges on track marks on one column and the two outside beams are centered over two adjacent reflective recording areas on either side of said track marks whereby data in each of said areas may be read simultaneously, means for providing relative motion between said focused light beams and said pattern of track marks in a linear direction, and detector cells for detecting changes in reflectivity between the track marks, data spots and reflective areas.

* * * * *